(12) United States Patent
Sloop

(10) Patent No.: US 10,014,562 B2
(45) Date of Patent: Jul. 3, 2018

(54) DISTINGUISHING BATTERIES IN A RECYCLING STREAM

(71) Applicant: Steven E. Sloop, Bend, OR (US)

(72) Inventor: Steven E. Sloop, Bend, OR (US)

(*) Notice: Subject to any disclaimer, the term of this patent is extended or adjusted under 35 U.S.C. 154(b) by 529 days.

(21) Appl. No.: 14/521,349

(22) Filed: Oct. 22, 2014

(65) Prior Publication Data

US 2015/0108989 A1 Apr. 23, 2015

Related U.S. Application Data

(60) Provisional application No. 61/894,093, filed on Oct. 22, 2013.

(51) Int. Cl.
| | |
|---|---|
| *B07C 5/16* | (2006.01) |
| *H01M 10/54* | (2006.01) |
| *B07C 5/342* | (2006.01) |
| *B03B 9/06* | (2006.01) |

(52) U.S. Cl.
CPC ............. *H01M 10/54* (2013.01); *B07C 5/16* (2013.01); *B07C 5/342* (2013.01); *B03B 2009/066* (2013.01); *Y02W 30/84* (2015.05)

(58) Field of Classification Search
CPC .... B07B 5/16; B07B 5/18; B07B 5/22; B07B 5/342; B07B 5/3422; B07B 5/344; B03B 9/06; B03B 2009/006; Y02W 30/84; H01M 10/54; B07C 5/16; B07C 5/18; B07C 5/22; B07C 5/342; B07C 5/3422; B07C 5/344
USPC ............. 209/576, 577, 592, 645, 930
See application file for complete search history.

(56) References Cited

U.S. PATENT DOCUMENTS

| | | | | |
|---|---|---|---|---|
| 7,472,031 | B2 * | 12/2008 | Georgitsis | G01G 11/04 209/592 |
| 2009/0321511 | A1 * | 12/2009 | Browne | B03B 9/061 209/629 |

* cited by examiner

*Primary Examiner* — Joseph C Rodriguez
*Assistant Examiner* — Kalyanavenkateshware Kumar
(74) *Attorney, Agent, or Firm* — Alleman Hall Creasman & Tuttle LLP

(57) ABSTRACT

Examples are disclosed herein that relate to identifying batteries of different chemistries such as in a battery recycling stream. One example provides a method for differentiating between batteries of different chemistries, the method comprising determining an expected mass of a sample of one or more batteries based upon an expected chemistry of the sample of one or more batteries, weighing the sample of one or more batteries to determine a sample mass, comparing the sample mass to the expected mass, and if the sample mass does not match the expected mass within a threshold range, then determining that the sample contains one or more batteries of a different chemistry than the expected chemistry.

19 Claims, 4 Drawing Sheets

DISTINGUISHING BATTERIES IN A RECYCLING STREAM

CROSS-REFERENCE TO RELATED APPLICATION

This application claims the benefit of U.S. Provisional Patent Application No. 61/894,093, filed Oct. 22, 2013, entitled DISTINGUISHING BATTERIES IN A RECYCLING STREAM, which is hereby incorporated by reference in its entirety for all purposes.

BACKGROUND

Batteries may utilize a wide variety of different chemistries to produce electrical power from chemical potential. For example, lead-acid batteries may utilize lead and lead oxide electrodes in combination with an aqueous sulfuric acid electrolyte, while lithium ion batteries may utilize a lithium-containing transition metal oxide (e.g. lithium cobalt oxide and/or lithium nickel manganese cobalt oxide) and carbon electrodes in combination with an organic and lithium ion electrolyte.

SUMMARY

Examples are disclosed herein that relate to identifying batteries of different chemistries such as in a battery recycling stream. One example provides a method for differentiating between batteries of different chemistries, the method comprising determining an expected mass of a sample of one or more batteries, weighing the sample of one or more batteries to determine a sample mass, comparing the sample mass to the expected mass, and if the sample mass does not match the expected mass within a threshold range, then determining that the sample contains one or more batteries of different chemistries than the expected chemistry.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Many batteries of different chemistries may have similar physical form factors due to standards related to battery packaging, as standard packaging may allow one battery technology to be replaced with another in a device without modifying the battery holder. As such, it may be difficult to identify a chemistry of a battery from physical appearance alone. Thus, it is possible that batteries of different chemistries may be confused in a high volume process, such as battery recycling.

Battery recycling attempts to recover materials from depleted batteries for reuse in new batteries. However, ensuring proper battery operation may require highly pure electrode compounds. Thus, if batteries having different chemistries are mixed in a same batch during recycling, cross-contamination of the battery materials may occur, which may impact the usability and commercial value of the recycled materials.

Therefore, examples are disclosed herein that relate to identifying batteries of different chemistries, for example, in a recycling stream to avoid cross-contamination during a recycling process. Briefly, some disclosed examples utilize measurements of mass to identify whether batteries of an incorrect chemistry for a recycling process are present. As a non-limiting example, lithium-containing batteries may be distinguished from lead-acid batteries by weighing a battery or a batch of batteries prior to recycling, and determining if the measured mass matches an expected mass. Other disclosed embodiments may utilize other methods (e.g. optical code reading) to distinguish batteries having similar form factors but different chemistries.

Figure 1:
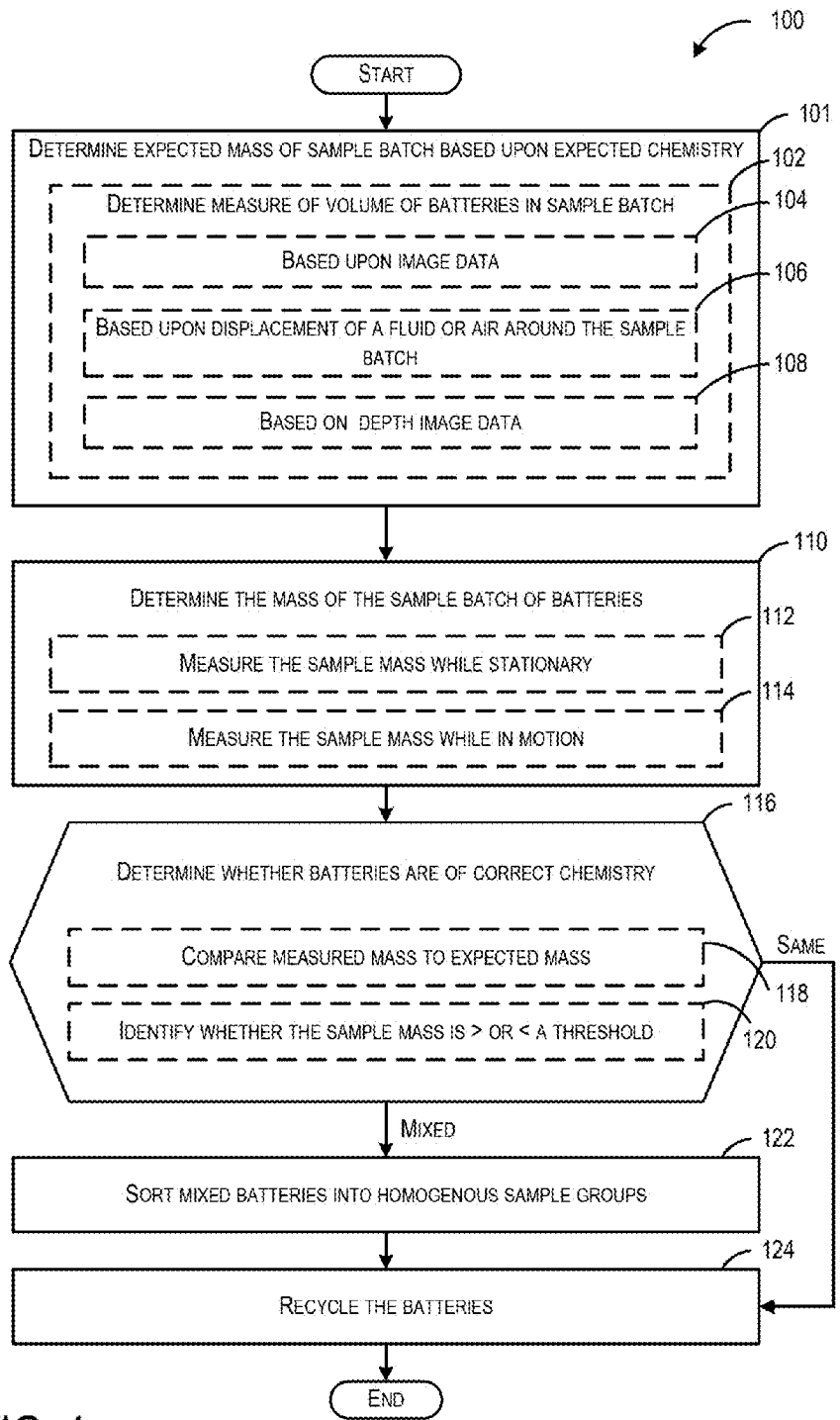
FIG. 1 is a flow chart showing an example of a method in accordance with the disclosure.

FIG. 1 shows an example method 100 for distinguishing between batteries in a processing stream via mass measurements. In some examples, the batteries may share the same form factor but have different chemistries and thus different constituent components, while in other examples the batteries may have different form factors. Method 100 may optionally comprise, at 101, determining an expected mass of a volume of a sample batch of batteries. In some implementations, the expected mass may be predetermined, for example, based upon an expected batch size (e.g. as determined by a bin size that holds the batteries, by a count of batteries in a sample, etc.) and also upon an expected chemistry of the sample.

In other implementations, the expected mass may be determined via measurement. For example, as indicated at 102, a measure of a volume of the batteries may be determined, and an expected mass may be determined from the volume of batteries and the expected chemistry of the batteries. Information on the measure of the volume of the batteries then may be used to determine an expected mass of the batch of batteries (or single battery) for selected battery chemistry. The measure of the volume may be any quantity that is representative of the volume, including but not limited to the volume itself, a number count, a size of a container holding the batteries, and/or any other quantity that may be used to determine the volume.

The measure of the volume of batteries may be determined in any suitable manner. For example, in some embodiments, a measure of the volume may be determined by capturing image data (e.g. color image data, infrared image data, grayscale image data, and/or other suitable image data) of the sample batch, as indicated at 104, and determining the number or volume of batteries from the image data. For example, pattern matching techniques may be used to identify batteries in the batch, and thus to determine a number of batteries in the batch. As another example, a total volume occupied by the batteries may be determined from information in the image data, and information regarding a volume percentage occupied by the batteries in an observed arrangement (e.g. neatly stacked or randomly piled) may be used to determine the volume of space occupied by the batteries.

Image data also may be used to read optical codes on the batteries. This may permit the battery type to be determined without having to determine a mass of the battery. However, it will be understood that such codes may not be available on batteries in a recycling stream.

The measure of the volume of batteries also may be determined via displacement methods, as indicated at 106. For example, a batch of batteries may be placed in a known volume of fluid, such as water or other liquid, and the displacement of the fluid by the batteries may be measured to determine the volume of the batch. Knowledge of the type of batteries in the sample (e.g. car starter batteries) may allow the number of batteries in the batch to be determined from the displacement. Measuring the volume of batteries by immersion in fluid also may allow the batteries to be discharged completely (e.g. by immersing the batteries in salt water) prior to recycling.

In some instances, immersing the batch of batteries directly in a fluid may lead to gas evolution. Such gas evolution may be addressed in various ways. For example, the batteries may be immersed in deionized water, mineral oil, silicone oil, and/or other suitable fluids that may help reduce battery discharge in the fluid that leads to such gas evolution compared to more electrically conductive fluids. Additionally or alternatively, the batch of batteries may be shrink-wrapped prior to immersing in fluid. In yet other examples, the measure of the volume of batteries may be determined via other displacement methods. As a non-limiting example, the measure of the volume may be determined via displacement of fluid by a boat containing the batch of batteries. As yet another example, the measure of the volume may be determined via displacement of a piston by measuring the volume of fluid (e.g. air) displaced by the batch of batteries on the piston. Such displacement methods may help fluids to avoid contact with the electrodes, and thus may help to reduce gas evolution compared to displacement methods in which the batteries are immersed directly into fluid. Further, such displacement methods may help to indicate that the batch of batteries contains batteries of different chemistries based on comparing the volume displaced on a piston, boat, etc. with an expected volume of displacement by batteries of an expected chemistry.

As yet another example, depth image data acquired via one or more depth cameras may be used to identify a volume and/or number of batteries in a batch, as indicated at 108. Depth image data may be used to measure, for example, an actual volume of space occupied by the batteries, and/or may be used along with object identification methods (e.g. classification or pattern matching methods) to identify a number of (and, in the case of multiple form factors, type of) batteries in the sample batch. The volume then may be determined from the number and type of batteries detected.

Figure 2:
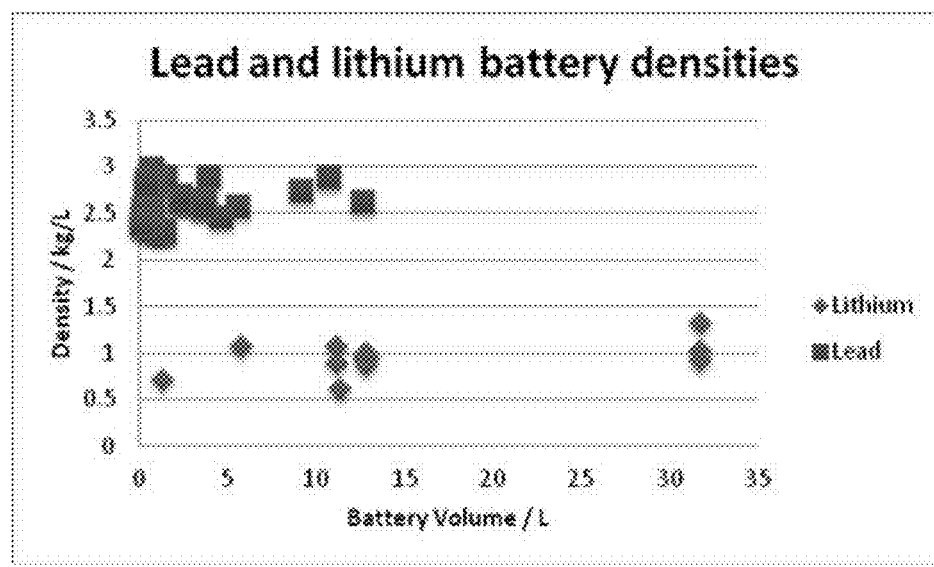
FIG. 2 is a chart showing the individual mass of members in a group of batteries with mixed chemistry.

Method 100 further comprises, at 110, determining the mass of the sample batch of batteries to identify potential differences in mass that would indicate different chemistries. As one non-limiting example, lead acid batteries may be significantly denser than lithium ion batteries due to the quantity of lead and water in such batteries. FIG. 2 shows a graph that illustrates density as a function of battery volume for lithium ion and lead acid batteries, and shows a bimodal distribution of densities between these battery types. In light of the bimodal distribution of densities of lead acid and lithium ion batteries, in some implementations a single battery may be identified as lead acid or lithium ion with a high level of confidence by measuring the battery's mass. Further, the mass of a batch of batteries may be measured to determine if there are any batteries of an incorrect chemistry mixed in with the batch. A larger batch containing a greater number of batteries may allow for more efficient measurement, but may be of lower sensitivity, as any one battery may affect the overall sample mass to a lesser extent. An optimum batch size may be determined by considering such factors as a sensitivity of the measurements, a tolerance for impurities in recycled materials, etc.

Any suitable methods may be used to determine the mass of the batteries. For example, as shown at 112, the sample batches may be weighed while stationary. Examples of such a process may range from placing a single battery on a scale, to measuring a large batch while secured in or on a container (such as a trailer or a palette) and subtracting the container mass.

In other examples, a battery or batch of batteries may be weighed while in motion, as shown at 114. For example, a weigh-in-motion scale may be incorporated into a conveyor belt in a process stream leading into the recycling facility. As another example, a weigh-in-motion scale may be used to weigh a vehicle carrying a batch of batteries into a facility.

It will be understood that these specific methods of determining battery volumes and masses are presented for the purpose of example, and are not intended to be limiting in any manner. Further, in some instances, a number of and/or volume of batteries (e.g. where a specific number of batteries of a single form factor are batched). Such information may be communicated with a bar code, color code, or other optical identification and may contain information regarding the sample batch's quantity, volume, mass or any combination of characteristics in addition to any other data. In such instances, the determination of a number and/or volume of batteries may be omitted.

It will also be understood that collecting sample batch characteristics as described in steps 102 and 110 may occur in any order. Additionally, the measurement of volume and mass may be conducted simultaneously with a suitably integrated process. For example, if the batch of batteries is being measured using water displacement, the mass increase of the container holding the water may also be determined.

Once the mass of a battery or batch of batteries and also the volume of, or number of batteries in, a batch are known, it may be determined whether the mass of the batch meets the expected mass to determine whether the battery or batch contains batteries the correct chemistry, as indicated at 116. As one example, a density may be determined and compared to known battery densities to determine a best match, as indicated at 118. If the density of the batch falls outside of a threshold range of the expected density, as indicated at 120, then it may be determined that the battery or batteries is of a different chemistry. The calculated density of the sample is compared to a threshold, which in some examples may be based on a limit associated with the selected standard density.

If it is found that the sample batch contains batteries of the sufficiently same chemistry (e.g. whether an estimated number of batteries of different chemistries is within an acceptable range), then the batch may proceed to the appropriate recycling process, at 124. However, if it is found that the sample batch contains batteries of mixed chemistry, one or suitable actions may be performed. For example, a suitable alert may be output, and/or the batch may be automatically or manually sorted into sorted batches at 122 to sort the batteries into homogeneous groups based upon chemistries. Each sorted batch may be processed using method 100 if desired to determine whether the sorted batch is homogeneous, or still contains unwanted chemistries.

Figure 3:
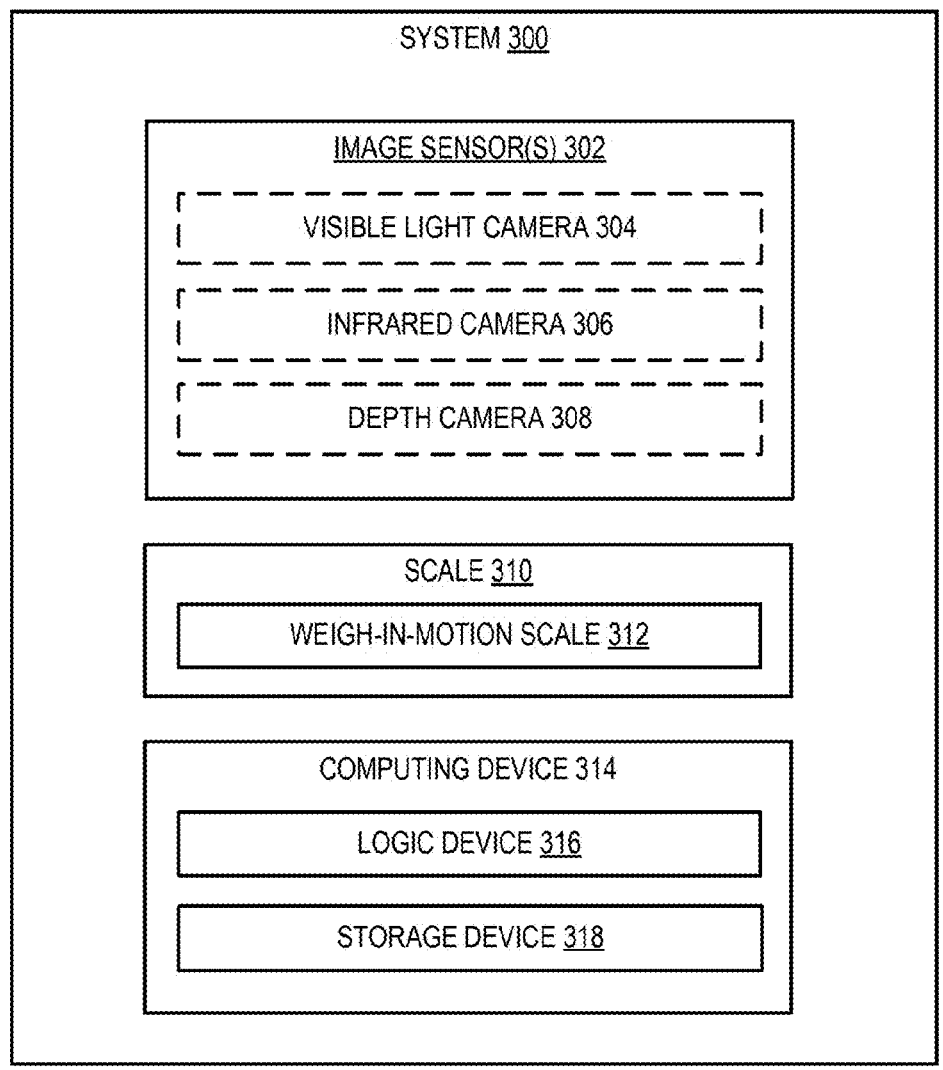
FIG. 3 is a block diagram showing an example system for differentiating between batteries of different chemistries in accordance with the disclosure.

FIG. 3 shows an example system 300 for differentiating between batteries of different chemistries as disclosed herein. System 300 may comprise or otherwise communicate with various components that permit acquisition a measure of the volume and mass of a sample of batteries to be determined. For example, system 300 may comprise or otherwise communicate with one or more image sensors 302, which may help to determine a measure of a volume of a sample of batteries, as discussed above. Image sensor(s) 302 may represent a visible light camera 304, an infrared camera 306, a depth camera 308, and/or any other optical sensing technology. The image sensor(s) may be configured to determine a volume of the sample in any suitable manner, such as by depth and/or two-dimensional image data of the sample to determine sample dimensions, either on an overall basis or by individual batteries, by optically scanning bar codes or other tags located on batteries in the sample, and/or in any other suitable manner. It will be understood that system 300 may include other components to assist in the acquisition of such data, including but not limited to light source(s) (e.g. a structured light or time-of-flight projector for a depth camera). System 300 further may include or otherwise communicate with one or more sensors configured to measure a volume of fluid displaced by that measure a volume of fluid displaced by the sample of batteries, and/or any other suitable volume determining components.

System 300 may further comprise a scale 310 to determine the measure of the mass or mass of the sample. Scale 310 may comprise a weigh-in-motion scale 312 to allow a mass measurement to be acquired while the sample is in motion, or may comprise a stationary scale.

System 300 further comprises a computing device 314 comprising a logic device 316 and also a storage device 318, wherein the storage device 318 stores instructions executable by the logic device 316 to perform one or more of the methods disclosed herein. For example, the instructions may be executable to receive inputs from the image sensors, scale, etc., to determine an expected sample mass (e.g. from a measure of the volume of the sample) and an actual sample mass, and compare the actual sample mass to the expected sample mass to determine if the sample contains one or more batteries of a different chemistry than the expected chemistry.

It will be understood that the components of system 300 may be arranged in any suitable relation. For example, the weighing component may be located along a process line either before or after a component that determines a measure of volume. Further, in some implementations, a volume of a sample may be assumed or predetermined, rather than determined on a sample-by-sample basis. For example, a volume of a sample may be set by a bin size used to hold the sample. In such examples, the expected mass of the sample also may be predetermined. Thus, the expected mass may be determined simply by retrieving the predetermined expected mass from a memory/storage device. It also will be understood that system 300 may include additional components not shown in FIG. 3, such as conveyors, sorting devices (e.g. size-selective sorting devices, materials-selective sorting devices, optical sorting devices, mechanical sorting device, and/or other suitable sorting devices) and other equipment for implementing the processes disclosed herein.

Figure 4:
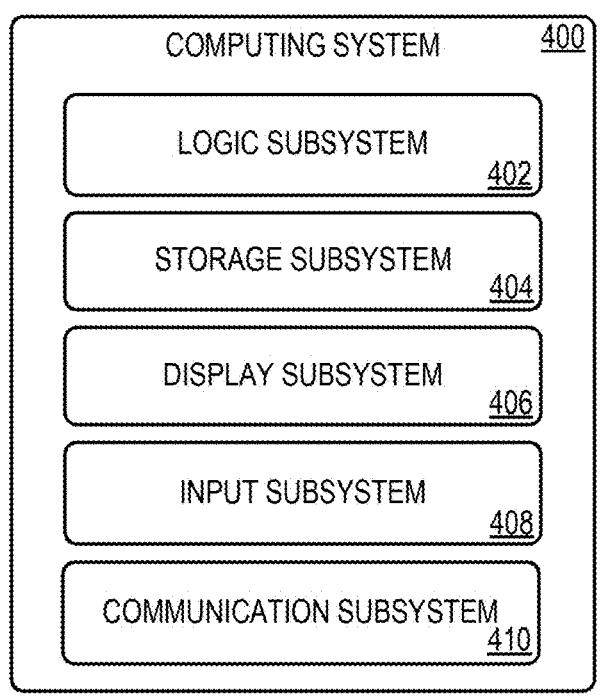
FIG. 4 is a block diagram of an example computing device.

Computing device 314 may take any suitable form. For example, FIG. 4 shows a block diagram of a non-limiting example computing system 400 that can enact one or more of the methods and processes described above. Computing system 400 may be representative of computing device 314 shown in FIG. 3. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic subsystem 402 and a storage subsystem 404. Computing system 400 may optionally include a display subsystem 406, input subsystem 408, communication subsystem 410, and/or other components not shown in FIG. 4.

Logic subsystem 402 includes one or more physical devices configured to execute instructions. For example, logic subsystem 402 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 402 may include one or more processors configured to execute software instructions. Additionally or alternatively, logic subsystem 402 may include one or more hardware or firmware logic machines configured to execute hardware or firmware instructions. Processors of logic subsystem 402 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of logic subsystem 402 may be virtualized and executed by remotely accessible, networked computing devices configured in a cloud-computing configuration.

Storage subsystem 404 includes one or more physical devices configured to hold instructions executable by the logic machine to implement the methods and processes described herein. When such methods and processes are implemented, the state of storage subsystem 404 may be transformed—e.g., to hold different data.

Storage subsystem 404 may include removable and/or built-in devices. Storage subsystem 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 404 may include volatile, nonvolatile, dynamic, static, read/write, read-only, random-access, sequential-access, location-addressable, file-addressable, and/or content-addressable devices.

It will be appreciated that storage subsystem 404 includes one or more physical devices. However, aspects of the instructions described herein alternatively may be propagated by a communication medium (e.g., an electromagnetic signal, an optical signal, etc.), as opposed to a storage device that stores instructions.

Aspects of logic subsystem 402 and storage subsystem 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 406 may be used to present a visual representation of data held by storage subsystem 404. This visual representation may take the form of a graphical user interface (GUI), an augmented reality image, or other suitable generated image. As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic subsystem 402 and/or storage subsystem 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims. For example, although the figures are drawn to scale, numerous variations may be made in the size and shape of the components illustrated.

The invention claimed is:

1. A method for differentiating between batteries of different chemistries, the method comprising:
determining an expected mass of a sample of one or more batteries, the expected mass based upon a measure of a volume of the sample and an expected chemistry of the sample;
weighing the sample of one or more batteries to determine a sample mass;
comparing the sample mass to the expected mass; and
if the sample mass does not match the expected mass within a threshold range, then determining that the sample contains one or more batteries of a different chemistry than the expected chemistry.

2. The method of claim 1, wherein determining the measure of a volume of the sample comprises determining the measure of the volume based upon image data, and determining the expected mass from the measure of the volume and the expected chemistry of the sample.

3. The method of claim 2, wherein determining the measure of the volume comprises identifying a number of batteries in the sample, identifying a battery type, and determining the measure of the volume based upon the number and the battery type.

4. The method of claim 1, wherein determining the expected mass of the sample comprises determining a measure of the volume of the sample by placing the sample in a fluid and measuring a displaced volume of the fluid.

5. The method of claim 1, wherein weighing the sample comprises weighing the sample while the sample is stationary.

6. The method of claim 1, wherein weighing the sample comprises weighing the sample while the sample is in motion.

7. The method of claim 1, wherein determining the expected mass of the sample comprises retrieving a predetermined value of the expected mass of the sample.

8. The method of claim 1, further comprising, upon determining that the sample contains batteries of a different chemistry than the expected chemistry, sorting the one or more batteries into one or more groups of homogenous chemistry.

9. A system configured to differentiate between batteries of different chemistries in a sample comprising a plurality of batteries, the system comprising:
one or more sensors;
a computing device comprising a logic device and a non-transitory computer-readable medium storing instructions executable by the logic device to
receive sensor data from the one or more sensors regarding a measure of a volume of a sample comprising a plurality of batteries;
receive sensor data from the one or more sensors regarding a sample mass of the sample;
compare the sample mass to an expected mass, the expected mass being based upon the measure of the volume and an expected chemistry; and
if the sample mass does not match the expected mass within a threshold range, then output a determination that the sample contains one or more batteries of a different chemistry than the expected chemistry.

10. The system of claim 9, further comprising an image sensor configured to acquire image data, and wherein the instructions are executable to acquire the measure of the volume by determining the measure of the volume based upon the image data.

11. The system of claim 10, wherein the instructions are executable to acquire the measure of the volume based upon the image data by identifying a number of batteries in the sample, identifying a battery form factor, and determining the measure of the volume based upon the number and the battery form factor.

12. The system of claim 9, wherein the instructions are executable to acquire the measure of the volume by measuring a displaced volume of a fluid when the sample is placed in the fluid.

13. The system of claim 9, further comprising a scale, and wherein the instructions are executable to acquire the sample mass while the sample is stationary.

14. The system of claim 9, further comprising a weigh-in-motion scale, and wherein the instructions are executable to acquire the sample mass while the sample is in motion with the weigh-in-motion scale.

15. The system of claim 9, wherein the instructions are further executable to determine the expected mass based upon a density of batteries of the expected chemistry.

16. The system of claim 9, wherein the instructions are further executable to, upon determining that the sample contains batteries of a different chemistry than the expected chemistry, control a sorting of the one or more batteries into one or more groups of homogenous chemistry.

17. A method for differentiating between batteries of different chemistries, the method comprising:
- determining a measure of a volume of a sample of one or more batteries;
- weighing the sample of one or more batteries while the sample is in motion to determine a sample mass;
- comparing the sample mass to an expected mass, the expected mass being based upon the measure of the volume and an expected chemistry; and
- if the sample mass does not match the expected mass within a threshold range, then determining that the sample contains one or more batteries of a different chemistry than the expected chemistry.

18. The method of claim 3, wherein weighing the sample comprises weighing a vehicle carrying the sample.

19. The method of claim 3, wherein weighing the sample comprises weighing each of the one or more batteries on a conveyor belt.

\* \* \* \* \*